Figure 1:
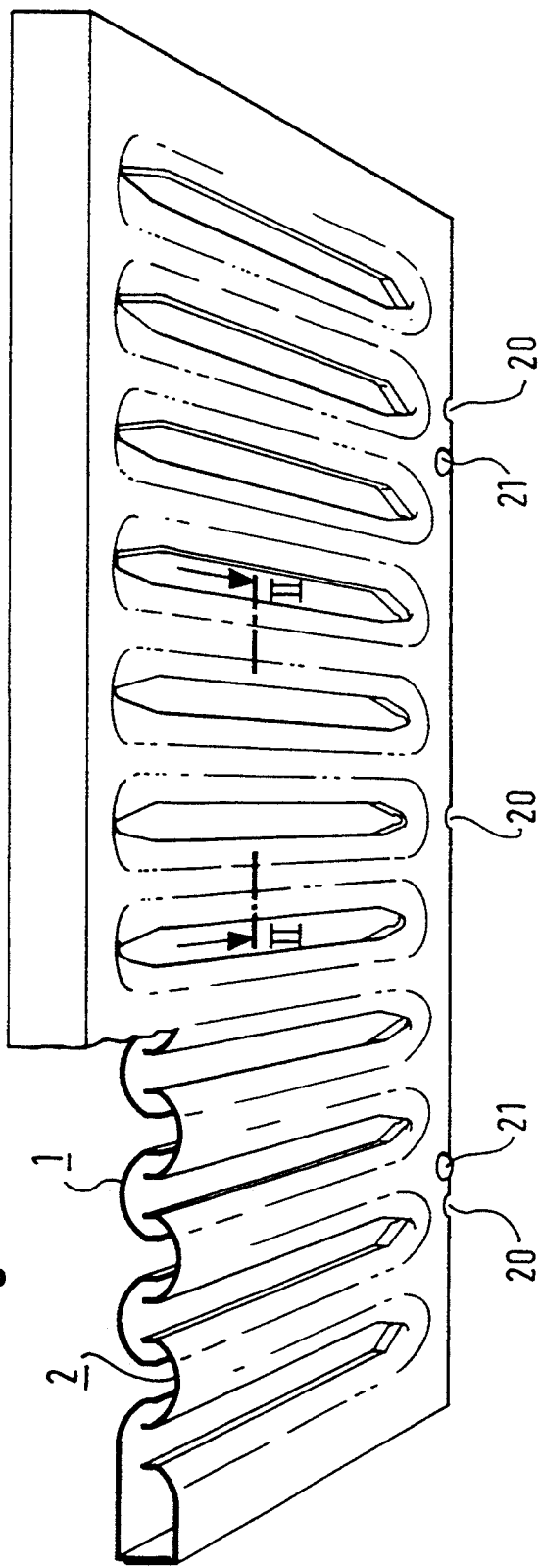

United States Patent [19]
Wimböck

[11] Patent Number: 5,342,422
[45] Date of Patent: Aug. 30, 1994

[54] APPARATUS FOR SEPARATING PARTICLES, IN PARTICULAR OIL OR FAT PARTICLES

[75] Inventor: Peter Wimböck, Reit im Winkl, Fed. Rep. of Germany

[73] Assignee: Wimböck Besitz GmbH, Reit im Winkl, Fed. Rep. of Germany

[21] Appl. No.: 159,425

[22] Filed: Nov. 30, 1993

[30] Foreign Application Priority Data

Mar. 2, 1993 [EP] European Pat. Off. ...... 93 103 296.5

[51] Int. Cl.⁵ ............................................. B01D 45/06
[52] U.S. Cl. ........................................ 55/444; 55/446
[58] Field of Search ................. 55/441, 442, 443, 444, 55/445, 446, 464

[56] References Cited

U.S. PATENT DOCUMENTS

2,720,938 10/1955 Calls ...................................... 55/444
3,813,856 6/1974 Jensen .
4,175,935 11/1979 Gutermuth et al. .
4,189,990 2/1980 Kittler .

FOREIGN PATENT DOCUMENTS

2641765 3/1978 Fed. Rep. of Germany .
2718611 11/1978 Fed. Rep. of Germany .

*Primary Examiner*—Charles Hart
*Attorney, Agent, or Firm*—Dilworth & Barrese

[57] ABSTRACT

Apparatus for separating particles, in particular oil or fat particles, out of an airstream flowing through the apparatus.

Apparatus of this kind are particularly used in large kitchens in order to separate fat particles out of the exhaust air. To reduce the number of required parts while maintaining the high degree of separation of particles and maintaining the total height of the apparatus, a special lamella shape (1,2) is described which consists in cross section in its middle region of a circular arcuate piece which extends over 120° to 130° and of two parallel straight longitudinal edges (1a,2a). On account of the special lamella shape (1,2), the forming of a row of parallel lamellas out of a metal sheet is possible while maintaining the high degree of separation and maintaining the small total height of the apparatus.

12 Claims, 1 Drawing Sheet

U.S. Patent     Aug. 30, 1994     5,342,422

APPARATUS FOR SEPARATING PARTICLES, IN PARTICULAR OIL OR FAT PARTICLES

The present invention relates to an apparatus according to the preamble of claim 1.

Apparatus of this kind are particularly used in large kitchens in order to separate the oil and fat particles out of the exhaust air. In comparison to common devices with aluminum wire-mesh filter members, they have a considerably greater degree of separation and can be cleaned without problems. Additionally, the burning of these apparatus with the consequently resulting danger of fire in the exhaust air channels is practically no longer possible.

An apparatus for supplying and removing air from rooms with a moist and/or fat atmosphere is known from DE-OS 27 18 611.

In these known apparatus circular lamellas are provided with openings extending in the longitudinal direction, the adjacent lamellas of which are respectively alternatively arranged with their opening upwards or downwards, the lamellas engaging in one another and their edges engaging each other behind at a distance. The circular arcuate lamellas have an inner angle of more than 180°. In the overlapping area of the engaging lamellas, this results in a corresponding oval chamber of a sufficient size to cause the air to flow with different flow velocities through these. The different flow velocities are caused by the double deflection about 180° and by the compression and expansion of the airstream when flowing in and out of the oval chambers. In this way, the particles in the airstream, in particular oil or fat particles, are thrown onto the inner surfaces of the lamellas on account of their greater mass, and can accumulate there and flow into a collecting trough.

An oval chamber which forms an expanding and narrowing turbulence path is already known from DE-AS 1 122 498. An apparatus is described in this published application in which the lamellas or baffle plates are concavely curved towards one another between the two deflecting zones. Such an arrangement of the chamber has the advantage that the flow hesitates after the deflection and is rearranged by the turbulence. The degree of separation of particles out of an airstream can be greatly increased by such an arrangement of a chamber in comparison to common separating apparatus such as aluminum wire-mesh filter members.

The mentioned apparatus for separating finely distributed liquid particles out of an airstream flowing through this consists of a plurality of lamellas which must be inserted in separately produced frames and positioned in order to obtain their defined relative position. Such a mode of assembly requires complicated and intensive manufacture and makes the product more expensive. Additionally, the required assembly height for a predetermined airstream is relatively high in order to obtain the described turbulence path.

An apparatus for separating fat from an airstream is also known, the U-shaped lamellas of which consist in cross section in their central part of a region which is flat in cross section and of a lamella edge piece which is bent with respect to this about approximately 45°. The lamellas in this known apparatus are displaced with respect to one another, but do not overlap. One row of lamellas in this known apparatus is respectively formed from a metal sheet in a drawing process. Such an apparatus has the advantage that an easier and cheaper manufacture is possible. However, this known construction fails by far to achieve the high degree of separation of the above mentioned solutions.

It is the object of the present invention to develop an apparatus of the kind initially described in such a manner that a high degree of separation is ensured with a simple structure.

This object is solved by an apparatus of the type initially mentioned by means of the characterizing features of claim 1.

On account of the special lamella shape according to the invention, the degree of separation of fat is approximately 98% in an airstream of approximately 0.5–1.5 m/s loaded with fat particles, which particularly corresponds to the requirements in large kitchens. This separate portion of fat corresponds to the degree of separation achieved with the known apparatus which are work-intensive in manufacture. However, the lamellas of one row can now be formed from a metal plate by a process such as drawing or also by injection of plastics.

A substantial advantage of the present invention lies in that the total assembly height determined by the tangents lying against the outer sides of the lower and upper lamella rows does not need to be increased in order to achieve the high degree of separation, as the chamber which greatly increases the degree of separation and expands and narrows again is produced by the special lamella shape and by the offset arrangement of the opposing lamellas.

An advantageous embodiment of the invention consists in that at least one of the facing inner surfaces of the concave hollows of the lamellas is provided with a structured surface. The structured surface forms projections and recesses which cause an even greater turbulence upon through-passage of the airstream in particular containing oil and fat particles and thus effects a further increase in the degree of separation.

However, in accordance with an advantageous further development these projections and recesses can equally be formed already when forming the lamellas out of the material. It is useful for rational production if the edges of the opposing sheets are respectively angled at 90° simultaneously with the manufacture of the lamellas. These angled edges of the opposing sheets are advantageously formed in such a manner that the metal sheets can be interlocked.

This further development of the invention makes a simple assembly of the apparatus possible and simultaneously considerably reduces the manufacturing costs of the apparatus.

In the case of a very high incidence of particles in the airstream, in particular oil or fat particles, an embodiment according to a further development is useful in which the metal sheets are combined together in the area of their edges by a frame receiving the end and longitudinal sides of the sheets. It is then possible to connect the plates releasably with one another by means of the frame in order to be able to individually and thus more easily and better clean the individual parts, i.e. the frame and the upper and lower sheets.

In order to ensure a problem-free flowing-off of the accumulating particles, in particular oil or fat particles, spaced openings are provided perpendicular to the lamellas in the built-in position on the lower metal sheets respectively at least on their lower edge, but preferably also on their upper edge, the particles being able to pass through these openings onto a collecting trough or the like.

In order for the openings to have a gap facing the collecting troughs to ensure a problem-free flowing-off of the particles towards the collecing troughs, spaced projections are provided perpendicularly to the lamellas on the lower metal sheets respectively at one edge in the built-in position.

Figure 2:
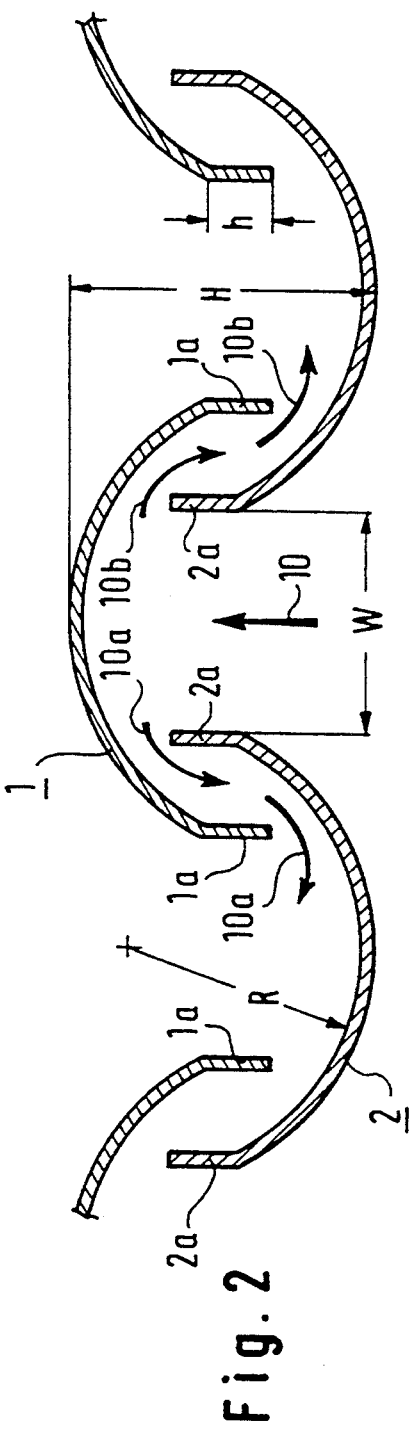

In the following, an exemplified embodiment of the invention is described in more detail for further explantion and better understanding with reference to the drawings, in which:

FIG. 1 shows a perspective view of an apparatus according to the invention which is partially sectioned, and FIG. 2 shows the enlarged cross section of a number of lamellas in a section in the plane of FIG. 1.

In the present exemplified embodiment, the facing metal sheets from which the lamellas are formed have bends of 90° at their end and longitudinal edges. In this manner, the two metal sheets can be interlocked and form an apparatus for separating particles provided directly for insertion in a ventilation assembly.

A lamella 1, 2 consists in cross section of a circular arcuate piece of 120° to 130°, the radius of which is approximately ¾ of the desired total assembly height H. By rounding off or bending, two straight lamella edges 1a, 2a are formed parallel to the axis of symmetry of the circular arcuate piece. The height h of the formed straight lamella edges 1a, 2a is approximately 3/20 to 6/20 of the total height H of the apparatus. One row of the lamellas 1, 2 which face one another is respectively formed from a metal sheet in a drawing process. For this purpose, the metal sheet is provided with bores at the intended upper and lower lamella ends. The opposing bores are connected with one another with the aid of a tool by means of cutting in and the lamella edges finally ensuing on account of this as well as the basic lamella body—the circular middle piece—is drawn in a drawing process into the shape claimed in claim 1.

The end and longitudinal edges of the metal sheet are simultaneously bordered and thus form a frame. The one frame of a metal sheet is dimensioned in such a manner that it can be sunk into the other frame of the other metal sheet. The lamellas 1, 2 formed respectively out of the metal sheets and lying opposite one another are offset in such a manner that the opposing lamellas form a chamber which narrows and widens and then narrows again, the chamber increasing the degree of separation of particles out of an airstream 10 flowing therethrough.

The lamella profile form according to the invention makes the formation of such a chamber between two opposing lamellas 1, 2 possible by maintaining the total assembly height H, which is only possible in the prior art by means of lamella profiles which extend over more than 180°. The inventive apparatus has the advantage that a very high degree of separation of finely distributed particles out of an airstream can be achieved and the lamella profile form according to the invention can be manufactured in a simple manner, as the undercutting for forming a chamber which increases the degree of separation is no longer necessary. A considerable reduction in the required individual parts is achieved with the lamella profile form according to the invention.

The inventive apparatus is inclined at a certain angle with respect to the horizontal in the lamella direction so that the particles separated in the apparatus collect at the lower edge in the built-in state and can flow through openings 20 in the lower edge onto a collecting apparatus lying therebeneath.

If an airstream 10 containing dirt particles passes in the direction of the arrow 10—according to FIG. 2—with a flow velocity of 0.2-2.0 m/s between two lamellas 2, it is separated at the inside of the opposing lamella 1 into two partial streams 10a, 10b and passes from there to the inside of lamella 1 where it is respectively combined with the adjacent partial stream 10a, 10b and exits between the lamellas 1 out of the inventive apparatus.

During this passage, the airstream 10 on the inlet side initially compresses between circular arcuate pieces of the lamellas 2. Following an expansion phase inside the lamellas 1 upon separation into the partial streams 10a, 10b, a renewed compression ensues upon passing the longitudinal edges 1a, 2a of the lamellas 1, 2. An expansion then ensues between the longitudinal edges 1a, 2a of the lamellas 1, 2 and in flowing past the longitudinal edges 1a, 2a of the lamellas 1, and 2, a renewed compression follows again, after which a renewed expansion inside the lamellas 2 occurs. Upon flowing out of the inside of the lamellas 2 between the longitudinal edges 1a of the lamellas 1, a renewed expansion takes place upon exiting out of the apparatus. In this manner, the airstream is compressed and expanded several times, on account of which—as tests have shown—the formation of drops essential for the degree of separation is initiated.

I claim:

1. Apparatus for separating particles, in particular oil or fat particules, out of an airstream flowing through the apparatus, including
    a plurality of lamellas (1,2) respectively substantially U-shaped in cross section and respectively arranged in two parallel opposing spaced adjacent rows,
    the lamellas (1,2) of both rows facing one another with their concave hollows and being offset with respect to one another in such a manner that the edges of two adjacent lamellas (1,2) of the one row lie opposite the concave hollow of a lamella (1,2) of the other row,
    the lamellas (1,2) respectively of each row being formed from a sheet, and
    the sheets of both rows being positioned at a distance from one another which corresponds to the total structural height (H) of the apparatus,
    characterized in that
    each lamella (1,2) as seen in cross section consists of:
    a circular arcuate piece extending over approximately 120° to 130° in its middle region with a radius (R) which is approximately ¾ of the total structural height (H),
    at its edge regions adjoining the middle region to both sides, respectively of parallel bent longitudinal edges (1a, 2a), the height (h) of which is 3/20 to 6/20 of the total structural height (H), and
    the inside width of an inlet channel (W) formed by the longitudinal edges of two adjacent lamellas of one row being approximately ¾ of the total structural height (H).

2. Apparatus according to claim 1, characterized in that at least one of the opposing concave hollows of the lamellas (1,2) is provided with a structured surface.

3. Apparatus according to claim 2, characterized in that the structured surface forms projections and recesses.

4. Apparatus according to claim 3, characterized in that the projections and recesses are formed out of the material of the lamellas (1,2).

5. Apparatus according to claim 1, characterized in that the edges of a sheet are respectively bent about 90°.

6. Apparatus according to claim 5, characterized in that the end and longitudinal edges are bent about 90° in such a manner that the sheets can be interlocked in one another.

7. Apparatus according to claim 1, characterized in that the sheets are joined in the region of their edges by a frame which receives the end and longitudinal edges of the sheets.

8. Apparatus according to claim 1, characterized in that the respectively lower sheet in the built-in state is provided at one edge perpendicular to the lamellas (1,2) with spaced projections (21) which project from the outer side of the apparatus and serve for placement on a carrier.

9. Apparatus according to claim 8, characterized in that the spaced projections (21) provided on the lower sheet are formed out of the sheet.

10. Apparatus according to claim 1, characterized in that the spaced openings (20) are provided in the lower sheet at least on the lower edge thereof perpendicular to the lamellas in the built-in state.

11. Apparatus according to claim 5 or 10, characterized in that the spaced openings (20) provided on the lower sheet are located exactly on the edge formed by the bending about 90°.

12. Apparatus according to claim 1, characterized in that the longitudinal edges adjoining the middle region of each lamella (1,2) to both sides in the cross section thereof are respectively angled parallel to the symmetrical axis of the circular arcuate piece extending about 120° to 130°.

* * * * *